(12) United States Patent
Miller et al.

(10) Patent No.: US 8,215,894 B2
(45) Date of Patent: Jul. 10, 2012

(54) DUAL CONFIGURATION SEAL ASSEMBLY FOR A ROTATIONAL ASSEMBLY

(75) Inventors: Jonathan Logan Miller, East Hampton, CT (US); Brian P. Cigal, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 1274 days.

(21) Appl. No.: 11/939,048

(22) Filed: Nov. 13, 2007

(65) Prior Publication Data
US 2009/0121441 A1 May 14, 2009

(51) Int. Cl.
*F04D 27/02* (2006.01)
(52) U.S. Cl. .......... 415/1; 415/111; 415/174.2; 415/231
(58) Field of Classification Search .................... 415/60, 415/66, 68, 69, 111, 174.2, 1
See application file for complete search history.

(56) References Cited

U.S. PATENT DOCUMENTS

| | | | |
|---|---|---|---|
| 3,250,512 A * | 5/1966 | Petrie | 415/135 |
| 3,942,804 A * | 3/1976 | Andress et al. | 277/412 |
| 4,141,212 A | 2/1979 | Koschier | |
| 4,159,888 A | 7/1979 | Thompson | |
| 4,405,134 A | 9/1983 | Sargent et al. | |
| 4,426,087 A | 1/1984 | Sargent et al. | |
| 4,754,984 A | 7/1988 | Keba | |
| 5,102,295 A | 4/1992 | Pope | |
| 5,464,227 A | 11/1995 | Olson | |
| 6,132,168 A | 10/2000 | Kovaleski et al. | |
| 6,196,790 B1 * | 3/2001 | Sheridan et al. | 415/111 |
| 6,619,908 B2 | 9/2003 | Bruno et al. | |
| 6,887,038 B2 * | 5/2005 | Cabe et al. | 415/174.2 |
| 7,837,199 B2 * | 11/2010 | Craig et al. | 277/377 |
| 7,938,616 B2 * | 5/2011 | Gille et al. | 415/111 |
| 2005/0047911 A1 * | 3/2005 | Cabe et al. | 415/174.2 |
| 2007/0096399 A1 * | 5/2007 | Miller et al. | 277/377 |
| 2007/0108704 A1 * | 5/2007 | Craig et al. | 277/370 |
| 2010/0264601 A1 * | 10/2010 | Craig et al. | 277/399 |

* cited by examiner

*Primary Examiner* — Edward Look
*Assistant Examiner* — Aaron R Eastman
(74) *Attorney, Agent, or Firm* — Carlson, Gaskey & Olds PC

(57) ABSTRACT

A seal assembly for a rotational assembly includes a first seal, a second seal and a crossover support. The crossover support includes a first geometry that interacts with the first seal and a second, different geometry that interacts with the second seal.

19 Claims, 3 Drawing Sheets

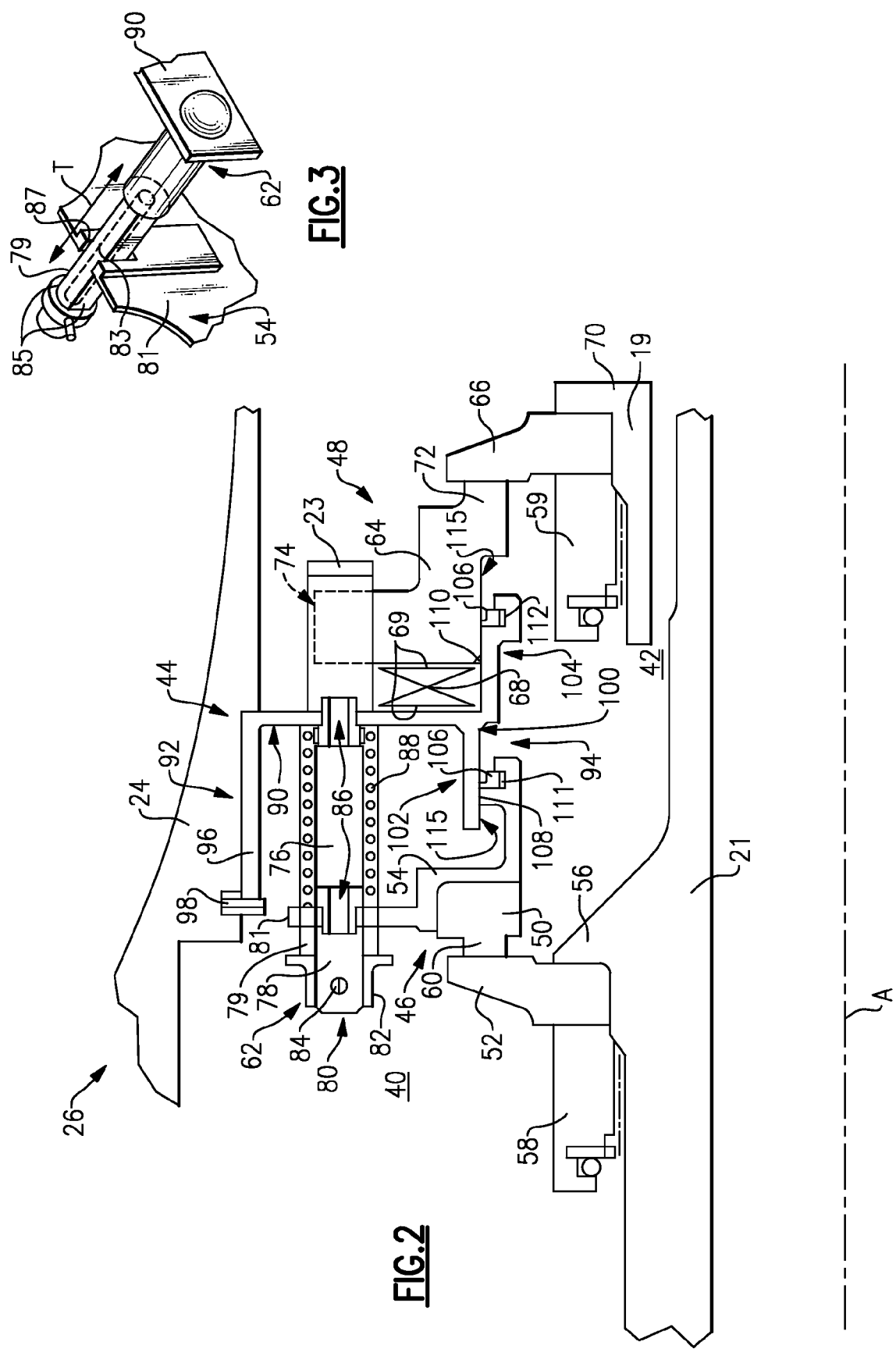

DUAL CONFIGURATION SEAL ASSEMBLY FOR A ROTATIONAL ASSEMBLY

BACKGROUND OF THE INVENTION

This invention generally relates to a seal assembly, and more particularly to an intershaft seal assembly for a rotational assembly.

Conventional mechanical seal assemblies are used in rotating equipment to provide a seal between regions of high and low fluid pressure and temperature. For example, seal assemblies are used to seal a rotating shaft on a pump, compressor, agitator, gas turbine, or other rotating equipment.

Gas turbine engine type rotational assemblies typically include (in serial flow communication) a fan section, a compressor section, a combustor section, and a turbine section. During operation, air is pressurized in the compressor section and mixed with fuel in the combustor section for generating hot combustion gases. The hot combustion gases flow through the turbine section which extracts energy from the hot combustion gases. In a multiple spool type gas turbine engine, a rotor assembly includes a high speed shaft and a low speed shaft that power the engine components using the energy extracted from the hot combustion gases.

In gas turbine engines, mechanical seal assemblies are used to prevent hot, high pressure air from entering a bearing compartment that operates at a low pressure and temperature. For example, a front bearing compartment in a multiple spool gas turbine engine is filled with an oil mist to lubricate the bearings that support the high speed rotor shaft and the low speed rotor shaft. The high speed rotor shaft and the low speed rotor shaft are separated by a gap filled with working medium gas. The working medium gas cools the rotor shaft. An intershaft seal assembly prevents the working medium gas from leaking into the oil compartment and prevents the oil mist from leaking out of the bearing compartment into the gap. The intershaft seal assembly typically includes two axially offset graphitic carbon ring mechanical face seals that seal the gap between the high speed rotor shaft and the low speed rotor shaft. Secondary seals may also be provided between the two face seals to limit leakage between the face seals.

Modern day advanced gas turbine engine programs typically include rotor shafts that operate at different speeds and have different sealing requirements. In some cases, the difference between the rotational speeds of a high speed rotor shaft and a low speed rotor may be relatively significant. The speed variations experienced by each face seal may result in unbalanced sealing between the high and low speed rotor shafts. Disadvantageously, known intershaft seal assemblies have not adequately provided for the different speed and sealing requirements of the rotor shafts. Additionally, intershaft seal assemblies are typically heavy, complex and expensive to produce, repair and replace.

Accordingly, it is desirable to provide a dual configuration intershaft seal assembly for a rotational assembly having rotor shafts including different sealing requirements that reduces seal assembly design space, reduces cost and reduces the overall weight of the rotational assembly.

SUMMARY OF THE INVENTION

A seal assembly for a rotational assembly includes a first seal, a second seal and a crossover support. The crossover support includes a first geometry for interacting with the first seal and a second, different geometry for interacting with the second seal.

A rotational assembly includes a first rotor shaft, a second rotor shaft, and a seal assembly extending between the first rotor shaft and the second rotor shaft. The seal assembly includes a first seal adjacent the first rotor shaft and a second seal adjacent the second rotor shaft. The first seal includes a different configuration than the second seal.

A method for sealing a gap between a high speed rotor shaft and a low speed rotor shaft of a rotational assembly includes positioning a first seal having a first configuration adjacent to the low speed rotor shaft, and positioning a second seal having a second configuration adjacent the high speed rotor shaft. The second configuration of the second seal is different from the first configuration of the first seal.

The various features and advantages of this invention will become apparent to those skilled in the art from the following detailed description. The drawings that accompany the detailed description can be briefly described as follows.

BRIEF DESCRIPTION OF THE DRAWINGS

FIG. 2 illustrates a cross-sectional view of a bearing compartment of the gas turbine engine illustrated in FIG. 1 including an example seal assembly;

FIG. 3 illustrates a schematic view of a portion of the example seal assembly illustrated in FIG. 2.

DETAILED DESCRIPTION OF THE PREFERRED EMBODIMENT

Figure 1:
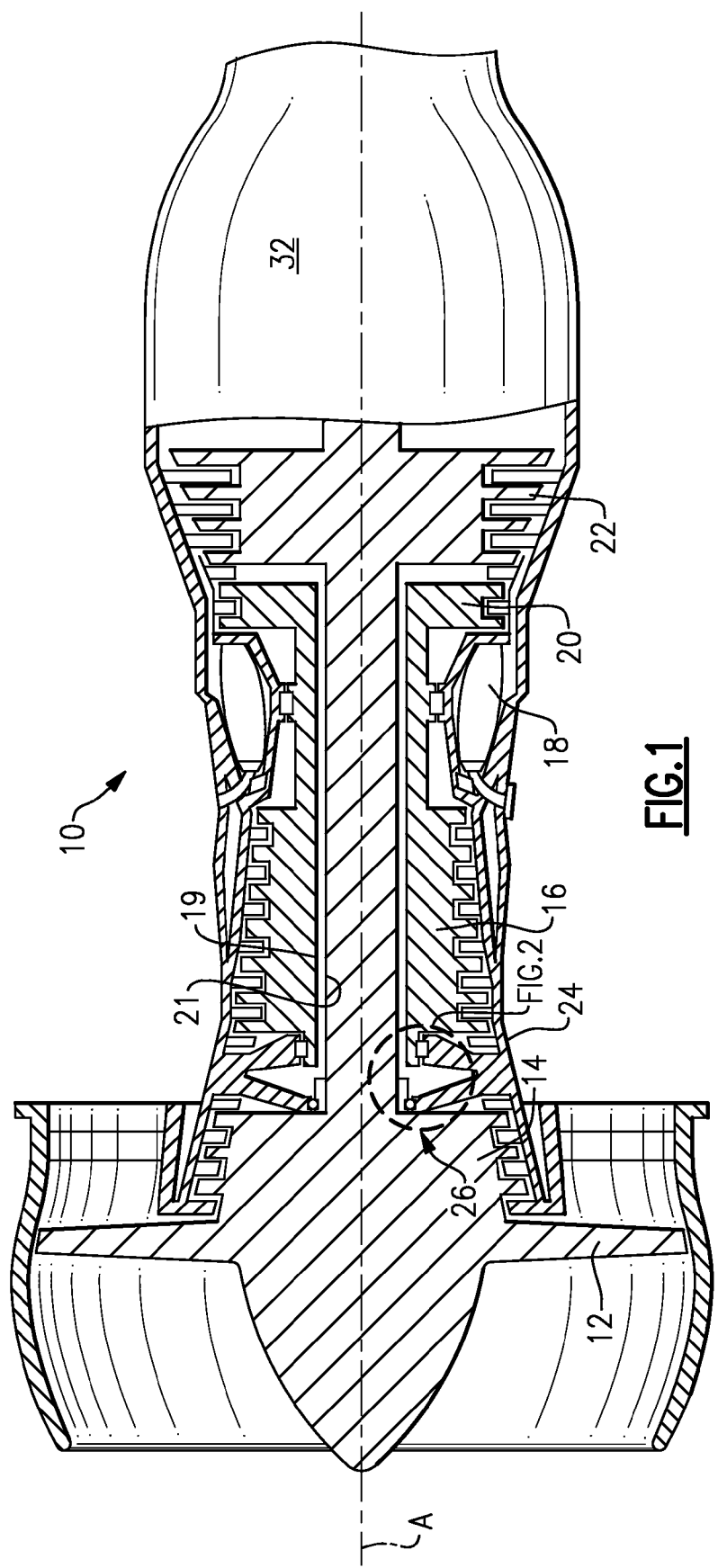
FIG. 1 illustrates an example gas turbine engine.

FIG. 1 illustrates selected portions of an example rotational assembly 10, such as a gas turbine engine, for example. In this example, the rotational assembly 10 includes a fan section 12, a low pressure compressor 14, a high pressure compressor 16, a combustor 18, a high pressure turbine 20 and a low pressure turbine 22 each disposed coaxially about an engine centerline axis A. During operation, air is pressurized in the compressors 14, 16 and mixed with fuel in the combustor 18 for generating hot combustion gases. The hot combustion gases flow through the high and low pressure turbines 20, 22, which extract energy from the hot combustion gases. The high pressure turbine 20 powers the high pressure compressor 16 through a high speed rotor shaft 19 and the low pressure turbine 22 powers the fan section 12 and the low pressure compressor 14 through a low speed rotor shaft 21. The invention is not limited to the two spool actual gas turbine architecture described and may be used with other architectures, such as a single spool actual design, a three spool actual design and other architectures.

Core exhaust gases are discharged from the core engine through a core exhaust nozzle 32. An annular, non-rotatable case 24 supports the high speed rotor shaft 19 and the low speed rotor shaft 21 on a sealing arrangement 26.

FIG. 2 illustrates a sealing arrangement 26 of the rotational assembly 10. The sealing arrangement 26 includes a front bearing compartment 40. The bearing compartment 40 is filled with an oil mist from a suitable source to provide lubrication and cooling. The high speed shaft 19 and the low speed shaft 21 are spaced apart, thereby defining a gap 42. The gap 42 is filled with working medium gas from either one or both of the compressor sections 14, 16, which cools the high and low speed rotor shafts 19, 21. The working medium gas in the gap 42 is typically much warmer than the temperature inside the bearing compartment 40. The high speed rotor shaft 19 and the low speed rotor shaft 21 are co-axial and are corotating, in one example. In another example, the high speed rotor shaft 19 and the low speed rotor shaft 21 are counter-rotating.

A seal assembly 44 minimizes leakage of the relatively high temperature working medium gas out of the gap 42 and into the bearing compartment 40. In addition, the seal assembly 44 minimizes the risk of the oil mist from leaking out of the bearing compartment 40 into the gap 42. In this example, the seal assembly 44 is an intershaft seal assembly for a gas turbine engine. Although the example seal assembly 44 is shown and described herein for sealing certain components of a gas turbine engine, it should be understood that other rotational assemblies would benefit from the seal assembly including, but not limited to, pumps, compressors, agitators, etc.

The example seal assembly 44 includes a first seal 46 extending circumferentially about the low speed rotor shaft 21 and a second seal 48 extending circumferentially about the high speed shaft 19. The first seal 46 and the second seal 48 are axially spaced within the bearing compartment 40. The first seal 46 and the second seal 48 include different configurations, as is further discussed below, and provide the necessary sealing between the gap 42 and the bearing compartment 40 of the rotational assembly 10.

The first seal 46 includes a seal element 50, a seal seat 52, and a seal housing 54. The seal seat 52 rotates with the low speed shaft 21, while the seal element 50 remains static with the casing 24.

The seal seat 52 is retained against an abutment 56 on the low speed shaft 21 by a nut assembly 58. Therefore, the seal seat 52 is carried by and rotates with the low speed shaft 21. The seal element 50 includes a nose 60 that contacts the seal seat 52 when the seal housing 54 is biased toward the seal seat 52 in a sealing position. In one example, the seal element 50 is an annular seal element, such as an annular graphitic carbon ring. However, a person of ordinary skill in the art having the benefit of this disclosure would be able to select an appropriate seal type for the example seal assembly 44. The seal housing 54 receives the seal element 50 in an interference fit, for example, and supports the seal element 50 relative to the seal seat 52 to provide sealing therebetween. The seal housing 54 is in turn supported by a series of circumferentially spaced guide members 62, as is further discussed below.

In one example, the second seal 48 includes a different configuration from the first seal 46. That is, the first seal 46 and the second seal 48 include different geometries, shapes, seal types etc. to accommodate the different speed and sealing requirements of the high speed shaft 19 and the low speed shaft 21.

The second seal 48 includes a monoblock seal element 64, a seal seat 66 and an annular spring 68. A second nut assembly 59 supports the seal seat 66 against an abutment 70 of the high speed shaft 19. The second seal 48 is a monoblock cartridge seal, in one example. It should be understood that a person of ordinary skill in the art would recognize other suitable seal types for use within the second seal 48. The monoblock seal element 64 includes a nose 72 that interacts with the seal seat 66 to provide sealing between the bearing compartment 40 and the gap 42.

The annular spring 68 biases the monoblock seal element 64 longitudinally to maintain positive contact between the monoblock seal element 64 and the seal seat 66. The annular spring 68 extends between wear layers 69. The wear layers 69 minimize wear of contacting surfaces. A radially outboard end 74 of the monoblock seal element 64 is secured by a series of circumferentially spaced anti-rotation lugs 23. The anti-rotation lugs 23 prevent the rotation of the monoblock seal element 64.

The seal 46 of the seal assembly 44 is supported by the guide members 62. Each guide member 62 includes a base section 76 and a neck section 78. A distal end 80 of the neck section 78 receives a retaining collar 82 to limit axial movement of the seal housing 54. Each of the distal end 80 and the retaining collar 82 include openings 84 to secure the retaining collar 82 on the distal end 80. A spacer sleeve 79 mounts on the neck section 78 of each guide member 62.

The guide members 62 axially guide movement of the seal housing 54 along a translation direction T via engagement with the spacer sleeve 79 and flange 81 of the seal housing 54 (See FIG. 3). The spacer sleeve 79 includes rounded sides 83 and flat sides 85 (FIG. 3). The flat sides 85 correspond to the flat sides of a guide slot 87 of the flange 81. The spacer sleeves 79 provide smooth movement of the seal housing 54 along the guide member 62, prevent rotation, and reduce friction and wear between the seal housing 54 and the neck section 78.

The support 90 and the seal housing 54 further include a plurality of circumferentially spaced coil spring guides 86. The spring guides 86 receive and retain coil springs 88. Moreover, the coil springs 88 bias the seal housing 54 longitudinally to maintain positive contact between the seal element 50 and the seal seat 52 of the first seal 46.

Figure 4:
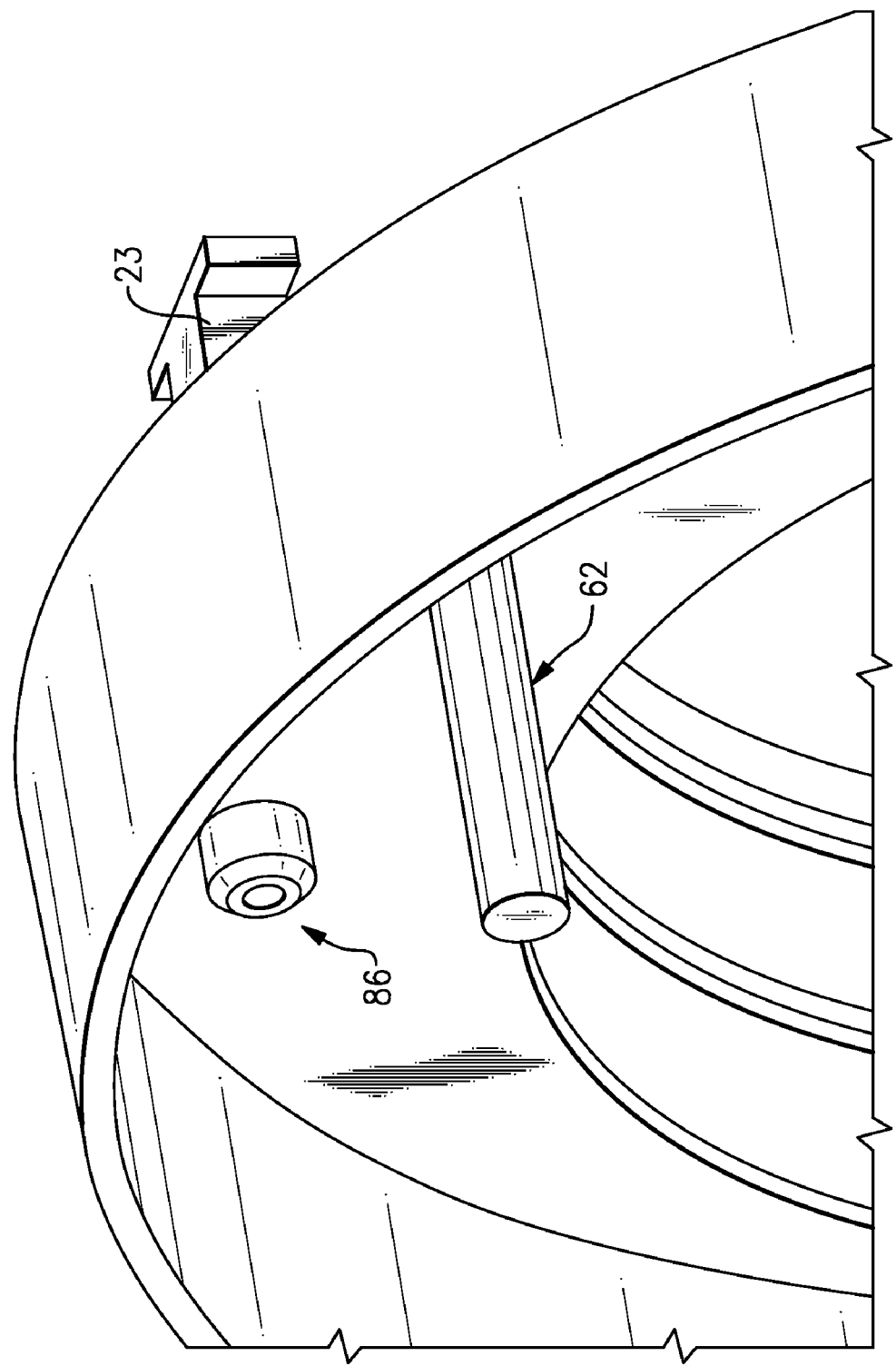
FIG. 4 illustrates a schematic view of another portion of the example seal assembly illustrated in FIG. 2.

The spring guides 86, the guide members 62 and the anti-rotation lugs 23 are offset circumferentially (See FIG. 4). In one example, the spring guides 86, the guide members 62 and the anti-rotation lugs 23 are radially offset an equal distance from the engine centerline axis A. Therefore, the spring guides 86, the guide members 62 and the anti-rotation lugs 23 provide anti-rotation and guide functions for both the first seal 46 and the second seal 48.

The example seal assembly 44 also includes a support 90. The support 90 includes a radial outboard end 92 and a radially inboard end 94. The radial outboard end 92 of the support 90 includes an outer bore 96 that is affixed to the case 24 by interference fit and a retaining ring 98.

The radial inboard end 94 of the support 90 includes a crossover support 100. In one example, the crossover support 100 extends transversely from the outer bore 96. In another example, the crossover support 100 is radially offset from the outer bore 96. In still another example, the crossover support 100 is radially inboard from the outer bore 96. The crossover support 100 enables the seal assembly 44 to accommodate the different configurations of the first and second seals 46, 48.

The crossover support 100 includes a first geometry 102 that interacts with the first seal 46 and a second geometry 104 that interacts with the second seal 48. "Geometry" is intended to describe any arrangement of parts, objects, shapes and/or geometric figures that interact with and accommodate the different configurations of the first seal 46 and the second seal 48. In one example, the first geometry 102 and the second geometry 104 are different geometries. In another example, at least one of the first geometry 102 and the second geometry 104 include a pilot land. In this example, the second geometry includes a pilot land 110.

Secondary seals 106 radially seal the seal assembly 44. In one example, only the second geometry 104 includes a secondary seal 106. The seal housing 54 of the first seal 46 includes a pilot land 108 having a groove 111 for receiving a secondary seal 106. The second geometry 104 of the crossover support 100 also includes a groove 112 for receiving a secondary seal 106.

In one example, the second geometry 104 is radially offset from the first geometry 102. Therefore, the crossover support 100 provides a common balance diameter 115 for both the high speed shaft 19 and the low speed shaft 21 locations of the seal assembly 44. That is, the seal assembly 44 is radially sealed at an equal distance relative to the centerline axis A. Therefore, common secondary seal hardware for both the first seal 46 and the second seal 48 is provided by the seal assembly 44. In one example, the secondary seals 106 include piston rings. In another example, the secondary seals 106 include O-ring type seals. In still another example, the secondary seals 106 include C-ring type seals.

The example seal assembly 44 described herein provides dual configuration seal functionality for a rotational assembly. That is, the seal assembly 44 accommodates the different speed and seal requirements of a high speed shaft 19 and a low speed shaft 21, respectively, via the crossover support 100. The crossover support 100, for example, includes different geometries 102, 104 that interact with seal types having different configurations. In addition, the seal assembly 44 provides reductions in overall seal assembly design space, cost, weight, and part quantity while providing improved wear life.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A seal assembly for a rotational assembly, comprising:
   a first seal;
   a second seal;
   a crossover support between said first seal and said second seal and having a first geometry for interacting with said first seal and a second, different geometry for interacting with said second seal; and
   a spring in direct contact with one of said second seal and said crossover support.

2. The assembly as recited in claim 1, wherein said first seal includes a first configuration and said second seal includes a second configuration different from said first configuration.

3. The assembly as recited in claim 1, wherein said first seal includes an annular seal element.

4. The assembly as recited in claim 1, wherein said second seal includes a monoblock seal element.

5. The assembly as recited in claim 1, wherein said crossover support includes at least one secondary seal positioned adjacent to a radially inboard side of said seal assembly.

6. The assembly as recited in claim 1, wherein at least a portion of said crossover support is positioned on a radially inboard side of said seal assembly.

7. The assembly as recited in claim 1, wherein said crossover support is radially offset relative to an outer bore of a support positioned adjacent to a case of the rotational assembly.

8. The assembly as recited in claim 1, wherein at least one of said first geometry and said second geometry includes a pilot land.

9. The assembly as recited in claim 1, wherein said second seal includes at least one anti-rotation lug and said spring is annular.

10. A rotational assembly, comprising:
    a first rotor shaft;
    a second rotor shaft spaced apart from said first rotor shaft;
    a seal assembly extending circumferentially about said first rotor shaft and said second rotor shaft, said seal assembly including a first seal adjacent said first rotor shaft and a second seal adjacent said second rotor shaft, wherein said first seal includes a different configuration than said second seal;
    a crossover support between said first seal and said second seal; and
    a spring in direct contact with one of said second seal and said crossover support.

11. The assembly as recited in claim 10, wherein said crossover support is at least partially positioned on a radially inboard side of said seal assembly.

12. The assembly as recited in claim 10, wherein said crossover support includes a first geometry for interacting with said first seal and a second, different geometry for interacting with said second seal.

13. The assembly as recited in claim 12, wherein at least one of said first geometry and said second geometry includes a pilot land.

14. The assembly as recited in claim 10, wherein said first rotor shaft is a low speed rotor shaft and said second rotor shaft is a high speed rotor shaft.

15. The assembly as recited in claim 10, wherein said first seal includes a metal-backed face seal and said second seal includes a monoblock cartridge seal.

16. The assembly as recited in claim 10, wherein the rotational assembly is a gas turbine engine and said seal assembly is an intershaft seal assembly.

17. A method for sealing a gap between a high speed rotor shaft and a low speed rotor shaft of a rotational assembly, comprising the steps of:
    (a) positioning a first seal having a first configuration adjacent the low speed rotor shaft;
    (b) positioning a second seal having a second, different configuration adjacent the high speed rotor shaft;
    (c) supporting each of the first seal and the second seal with a crossover support having a first geometry for interacting with the first seal and a second, different geometry for interacting with the second seal; and
    (d) positioning a spring in direct contact with one of said second seal and said crossover support.

18. The method as recited in claim 17, wherein the first seal includes a metal-backed face seal and the second seal includes a monoblock cartridge seal.

19. A seal assembly for a rotational assembly, comprising:
    a first seal including a first seal element, a first seal seat, and a seal housing that is biased toward said first seal seat to seal said first seal element against said first seal seat; and
    a second seal including a monoblock seal element, a second seal seat and an annular spring that biases said monoblock seal element toward said second seal seat, wherein a radially outboard end of said monoblock seal element is secured by at least one anti-rotation lug located radially outboard from said annular spring.

* * * * *